Feb. 19, 1946.  S. BOUSKY  2,395,246
MOTOR SPEED CONTROL
Filed Dec. 29, 1943
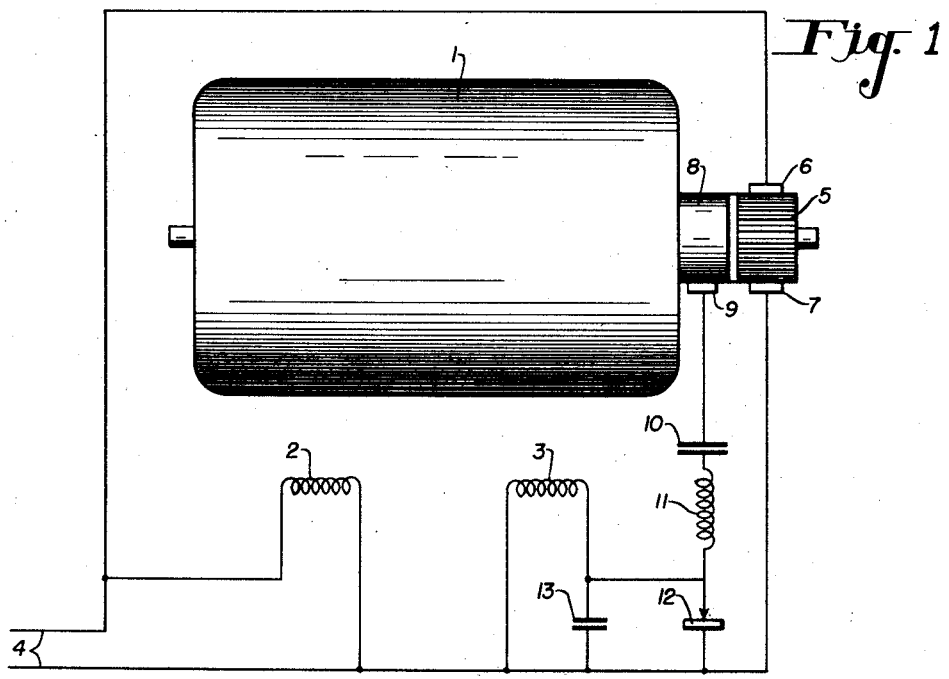
*Fig. 1*
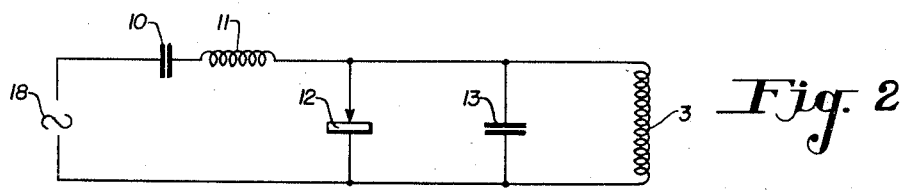
*Fig. 2*
*Fig. 3*
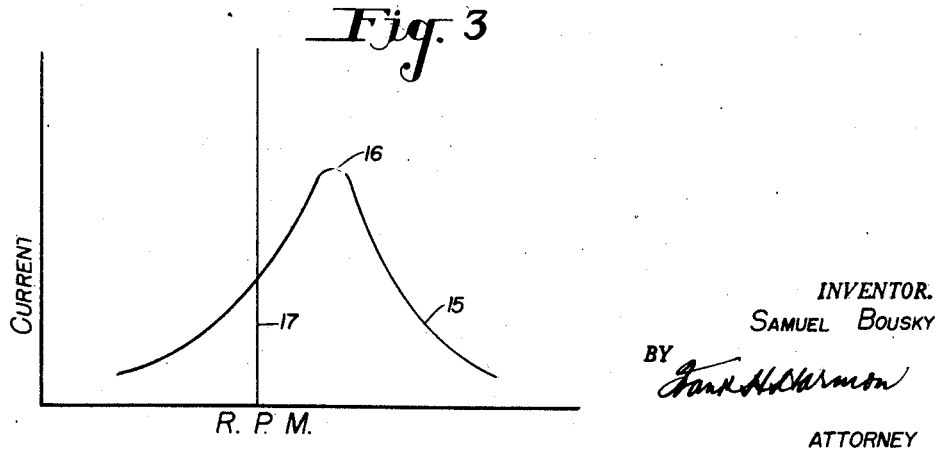
INVENTOR.
SAMUEL BOUSKY
BY
ATTORNEY Patented Feb. 19, 1946

2,395,246

UNITED STATES PATENT OFFICE 2,395,246

MOTOR SPEED CONTROL

Samuel Bousky, Shaker Heights, Ohio, assignor, by mesne assignments, to Jack & Heintz, Inc., Cleveland, Ohio, a corporation of Ohio Application December 29, 1943, Serial No. 516,056

4 Claims. (Cl. 171—312)

This invention relates to motor speed control and has as its general object to provide an improved system without moving parts for controlling the speed of a direct current motor.

In order to accomplish the general object it is a further object of the invention to provide an auxiliary motor field winding energized by a circuit responsive to rotational frequency to vary the field strength in accordance with motor speed to control the latter.

With the foregoing and other objects in view, the invention resides in the combination of parts and in the circuit arrangements hereinafter set forth in the following specification and appended claims, preferred embodiments thereof being illustrated in the accompanying drawing, in which:

Figure 1 is a schematic wiring diagram of a preferred embodiment of the electrical system;

Figure 2 is a diagram of the control system shown in Figure 1 redrawn in simplified form; and Figure 3 shows the resonance curve of the resonant circuit shown in Figures 1 and 2.

The numerals 1 and 2 indicate the armature and conventional field winding, respectively, of a direct current motor to be governed to run at a predetermined constant speed. The numeral 3 indicates an auxiliary field winding which is effective in the present system to change the field strength sufficiently to exert a governing action on the motor. The numeral 4 refers to a polarized direct current supply for the motor which supplies the field 2 directly and is fed into the armature 1 through a conventional commutator 5 having the usual brushes 6 and 7. The armature is also provided with a collector ring 8 tied electrically to any one of the bars in the commutator 5, this ring being otherwise insulated from the commutator bars. A brush 9 makes an external circuit from the collector ring 8 through a condenser 10, an inductance 11 and the auxiliary field 3, this circuit having associated therewith a rectifier 12 and a filtering condenser 13.

In operation, brushes 7 and 9 supply an alternating potential having a frequency proportional to the rotational speed of the armature. The rectifier 12 provides a parallel path around field 3 through condenser 10 and inductance 11 back to the armature during each half cycle when the rectifier is conductive. On alternate half cycles when the rectifier has a high impedance, the potential across brushes 7 and 9 causes a current to flow through auxiliary field winding 3 aiding the field 2. The condenser 10 and inductance 11 thereby form components of a series resonant circuit, the values of capacitance and inductance being chosen so that the desired operating speed of the motor will fall on the steep slope of the current resonance curve before its peak is reached. At lower speeds this circuit possesses a high impedance.

Figure 2 shows the resonance circuit redrawn in simplified form, the alternating current input being designated by the conventional symbol 18. The resonance curve for this circuit is shown at 15 in Figure 3 where current is plotted against rotational speed of the armature at and near the operating range. The line 17 represents the desired operating speed, and is to the left of the peak 16. As the speed approaches the line 17, the current in the resonant circuit and in the field 3 rapidly increases. When the speed exceeds the predetermined value at line 17, the aiding field 3 builds up to a sufficient strength to reduce the speed, this function occurring automatically in response to speed to exert an inherently stable governing action. If desired, the characteristics of the resonant circuit may be adjusted so that the peak 16 occurs at or beyond the maximum speed obtainable by the motor, to prevent operation beyond the resonance peak. To produce the above described operation, the source 4 must always be connected with the same polarity, which is determined by the polarity of the connections to rectifier 12 to make the field 3 operate in aiding relation to field 2.

This system may be applied to direct current motors in general, but is especially effective in connection with small battery powered shunt motors operating under constant load, where a relatively high frequency is developed across the brushes 7 and 9. Under these conditions the physical components of the resonance circuit may be made compact so as to occupy little space, and the governing action affords a smooth and close control without the use of a centrifugal governor, switch, or other moving parts.

If it is desired to provide for adjusting the value of operating speed, the capacity 10 may be made variable and such adjustment may be calibrated in terms of motor speeds.

This system of speed control is also especially suited for small permanent magnet motors, where the auxiliary field 3 is connected to aid the permanent magnet field. As the speed approaches the desired value, the resonance current increases the field strength to exert governing action as described in connection with the embodiment of Figure 1.

Other frequency responsive circuits may be devised to control the auxiliary field 3. For instance, the condenser 10 and inductance 11 may be arranged in a parallel resonant circuit instead of a series resonant circuit. In such case the field 3 would be connected in opposition to the main field, the resonant circuit having low impedance until the operating speed is approached, whereupon the rapidly increasing impedance would sharply reduce the current in the field 3. This, in effect, increases the effective strength of the main field to exert the desired governing action.

The invention is thus capable of various modifications and adaptations, and is to be limited only by the scope of the appended claims.

I claim:

1. Means for controlling a direct current motor comprising a field, an armature, a commutator on said armature, a pair of brushes associated with said commutator, a collector ring on said armature, said collector ring being electrically connected with one segment of said commutator, a third brush associated with said collector ring, a series resonant circuit supplied by said third brush and one of said pair of brushes, said circuit having a resonant frequency above the desired operating speed of said motor, and an auxiliary aiding field winding in said resonant circuit to increase the field strength of said motor to limit and control the speed thereof at a predetermined value below said resonant frequency.

2. Means for controlling a direct current motor comprising a field, an armature, a commutator on said armature, a pair of brushes associated with said commutator, a collector ring on said armature, said collector ring being electrically connected with one segment of said commutator, a third brush associated with said collector ring, a series resonant circuit supplied by said third brush and one of said pair of brushes, said circuit having a resonant frequency above the desired operating speed of said motor, and an auxiliary aiding field winding in said motor energized directly and solely by said circuit to increase the field strength sufficiently to regulate and prevent overspeeding of said motor.

3. In a direct current motor, a field winding, an armature, a commutator on said armature, a pair of brushes associated with said commutator, an external connection with one segment of said commutator, a series resonant circuit supplied by said external connection and one of said brushes, said circuit having a minimum impedance at a frequency above the desired operating speed of said motor, and an auxiliary aiding field winding energized directly and solely by said circuit in accordance with the frequency generated by said armature to increase the field strength of said motor sufficiently to limit and control the speed thereof.

4. A direct current motor comprising a shunt field winding, an armature, a commutator on said armature, a pair of brushes associated with said commutator, a collector ring on said armature connected with one segment of said commutator, a third brush associated with said collector ring, a series resonant circuit supplied by said third brush and one of said pair of brushes, said circuit having a resonant frequency above the desired operating speed of said motor, an auxiliary aiding field winding in said circuit to increase the field strength in accordance with the value of resonance current to limit and control the speed of said motor at a predetermined value below said resonance frequency, and rectifier and condenser elements associated with said auxiliary field winding to provide direct current energization thereof directly from said resonance current.

SAMUEL BOUSKY.